US010552282B2

(12) United States Patent
Gao et al.

(10) Patent No.: US 10,552,282 B2
(45) Date of Patent: Feb. 4, 2020

(54) ON DEMAND MONITORING MECHANISM TO IDENTIFY ROOT CAUSE OF OPERATION PROBLEMS

(71) Applicant: International Business Machines Corporation, Armonk, NY (US)

(72) Inventors: Xue Feng Gao, Beijing (CN); Peng Han, Beijing (CN); Zhen Yang Shi, Beijing (CN); Qing Feng Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 15/469,959

(22) Filed: Mar. 27, 2017

(65) Prior Publication Data

US 2018/0276096 A1    Sep. 27, 2018

(51) Int. Cl.
*G06F 11/30*    (2006.01)
*G06F 11/34*    (2006.01)

(52) U.S. Cl.
CPC ...... *G06F 11/3006* (2013.01); *G06F 11/3048* (2013.01); *G06F 11/3419* (2013.01); *G06F 11/3466* (2013.01)

(58) Field of Classification Search
None
See application file for complete search history.

(56) References Cited

U.S. PATENT DOCUMENTS

| 8,001,527 | B1 | 8/2011 | Qureshi et al. |
| 8,204,717 | B2 | 6/2012 | Mclaughlin et al. |
| 2005/0091396 | A1* | 4/2005 | Nilakantan ............ H04L 45/04 709/232 |
| 2005/0198275 | A1 | 9/2005 | D'Alo et al. |
| 2014/0047099 | A1 | 2/2014 | Flores et al. |
| 2014/0280068 | A1* | 9/2014 | Dhoopar ............... G06F 11/079 707/722 |
| 2015/0304232 | A1 | 10/2015 | Ashok et al. |
| 2015/0378763 | A1* | 12/2015 | Hassine ............. G06F 9/45558 718/1 |
| 2016/0259708 | A1 | 9/2016 | Della Corte et al. |

(Continued)

FOREIGN PATENT DOCUMENTS

| WO | 2015148328 A1 | 10/2015 |
| WO | 2015200508 A1 | 12/2015 |

OTHER PUBLICATIONS

Kiciman et al. "Live Monitoring: Using Adaptive Instrumentation and Analysis to Debug and MaintainWeb Applications", Microsoft Research; May 2007.

(Continued)

*Primary Examiner* — Angela Nguyen
(74) *Attorney, Agent, or Firm* — Brown & Michaels, PC; Christopher Pignato (57) ABSTRACT

A monitoring mechanism is used to detect, via client side monitoring, malfunctions of services within a cloud environment. Additional monitors are activated against the problem-related services in the system. Recursively, the monitored problem-related services act as the client to other services inside the cloud environment and can be used to detect more services which need to be monitored until all the problem-related services are monitored. After the problem is fixed, the monitoring can be disabled automatically or manually.

18 Claims, 7 Drawing Sheets

(56) References Cited

U.S. PATENT DOCUMENTS

2016/0274552 A1 9/2016 Strohmenger et al.
2016/0359592 A1* 12/2016 Kulshreshtha ...... H04L 63/1425
2017/0289191 A1* 10/2017 Thioux ............... H04L 63/1441

OTHER PUBLICATIONS

Cook et al. "Cloud Management", Hewlett-Packard Development Company; Dec. 2011.
Banerjee et al. "Challenges for creating highly dependable service based systems", 14th IEEE International Symposium on Object/Component/Service-Oriented Real-Time Distributed Computing Workshops; Apr. 2011.

* cited by examiner

ON DEMAND MONITORING MECHANISM TO IDENTIFY ROOT CAUSE OF OPERATION PROBLEMS

BACKGROUND

The present invention relates to cloud computing, and more specifically to an on demand cloud monitoring mechanism to quickly identify the root cause of cloud operation problems.

Monitoring is necessary in cloud environments to make sure that service level agreements (SLA) with the cloud customer are met. With more and more micro services and de-centralized applications using clouds within the cloud environment, the root cause of a failure in a whole application/service clusters is hard to identify via simple single tier monitoring. However, increased monitoring increases the resources consumed and in the cloud environment it is difficult to identify the root causes when a cloud operation failure occurs. The primary task of monitoring in a cloud environment is to find the potential problems in the system, and provide data for analyzing.

Currently within cloud environments, the monitoring scope can be manually adjusted to aid in determining a root cause of a failure within the environment. However, manually adjusting the monitoring scope is hysteretic and mistakable in large scale IT systems, the response as to why the failure has occurred is slow and an administrator still does not know which service host with which application in the cloud environment had the failure.

Another solution to determining the root cause of a failure within a cloud environment is to monitor granularity based on a situation which can be triggered by monitored key performance indicators (KPIs). This solution does not change the monitoring scope, and just changes the monitoring granularity (e.g. Level 2→Level 3) in the same component.

SUMMARY

According to one embodiment of the present invention, a method of determining root causes of operation problems of a service having a client side and a server side is disclosed. The service is provided by an environment comprising a plurality of nodes and sub-nodes connected through pathways, with the service being monitored by a monitoring probe with a monitoring agent comprising a monitoring suite and an analysis module. The method comprising the steps of: a) the monitoring probe receiving a response time of a service of the environment below a threshold on the client side of the service; b) the monitoring probe installing the monitoring suite and analysis module on a first node of the service on the server side of the service; c) the monitoring probe recording and analyzing data of the first node of the service to determine whether the response time of the service being below the threshold on the client side of the service is caused by the first node; d) the monitoring probe receiving an analysis as to whether the first node of the service is the cause of the response time of the service being below the threshold on the client side of the service; when the response time of the service being below the threshold on the client side of the service is not caused by the first node the monitoring probe: e) determining a next node in the pathway of the first node on the server side to install the monitoring suite and analysis module on to determine whether the response time of the service being below the threshold on the client side is caused by the next node on the server side; and repeating step e) until the cause of the response time of the service being below the threshold on the client side is determined or the pathway of nodes within the environment for the service has ended.

According to another embodiment, a computer program product for determining root causes of operation problems of a service having a client side and a server side is disclosed. The service is provided by an environment comprising a plurality of nodes and sub-nodes connected through pathways. The service is monitored by a monitoring probe with a monitoring agent comprising a monitoring suite and an analysis module. The monitoring probe comprising a computer comprising at least one processor, one or more memories, one or more computer readable storage media, the computer program product comprising a computer readable storage medium having program instructions embodied therewith. The program instructions executable by the computer to perform a method comprising: a) receiving, by the monitoring probe, a response time of a service of the environment below a threshold on the client side of the service; b) installing, by the monitoring probe, the monitoring suite and analysis module on a first node of the service on the server side of the service; c) recording and analyzing, by the monitoring probe, data of the first node of the service to determine whether the response time of the service being below the threshold on the client side of the service is caused by the first node; d) receiving, by the monitoring probe, an analysis as to whether the first node of the service is the cause of the response time of the service being below the threshold on the client side of the service; when the response time of the service being below the threshold on the client side of the service is not caused by the first node: e) determining, by the monitoring probe, a next node in the pathway of the first node on the server side to install the monitoring suite and analysis module on to determine whether the response time of the service being below the threshold on the client side is caused by the next node on the server side; and repeating program instructions e) until the cause of the response time of the service being below the threshold on the client side is determined or the pathway of nodes within the environment for the service has ended.

According to another embodiment, a computer system for determining root causes of operation problems of a service having a client side and a server side is disclosed. The service is provided by a environment comprising a plurality of nodes and sub-nodes connected through pathways. The service is monitored by a monitoring probe with a monitoring agent comprising a monitoring suite and an analysis module. The monitoring probe comprising a computer comprising at least one processor, one or more memories, one or more computer readable storage media having program instructions executable by the computer to perform the program instructions comprising: a) receiving, by the monitoring probe, a response time of a service of the environment below a threshold on the client side of the service; b) installing, by the monitoring probe, the monitoring suite and analysis module on a first node of the service on the server side of the service; c) recording and analyzing, by the monitoring probe, data of the first node of the service to determine whether the response time of the service being below the threshold on the client side of the service is caused by the first node; d) receiving, by the monitoring probe, an analysis as to whether the first node of the service is the cause of the response time of the service being below the threshold on the client side of the service; when the response time of the service being below the threshold on the client side of the service is not caused by the first node: e)

determining, by the monitoring probe, a next node in the pathway of the first node on the server side to install the monitoring suite and analysis module on to determine whether the response time of the service being below the threshold on the client side is caused by the next node on the server side; and repeating program instructions e) until the cause of the response time of the service being below the threshold on the client side is determined or the pathway of nodes within the environment for the service has ended.

DETAILED DESCRIPTION

In an embodiment of the present invention, a self-directed, propagable, pluggable monitoring mechanism detects and analyzes cloud application/service failures on demand. Using the monitoring mechanism, each cloud node in an application/service cluster of a cloud computing node plays a role as a monitoring anchoring point. It should be noted that monitoring anchoring points differ from server/client type monitoring. The monitoring mechanism of the present invention is propagable, pluggable, light weight, and cost effective. Furthermore, the monitoring mechanism of the present invention has optimized diagnosis paths derived from self-learning. Self-learning is also used to refine monitoring, analysis, key performance indicators, and weight information along paths of nodes of the cloud topology.

The monitoring mechanism of an embodiment of the present invention is only activated on the client side to monitor and obtain an outline status of the information technology (IT) system. Server side service is not monitored. When a problem is detected via the client side monitoring using the monitoring mechanism of an embodiment of the present invention, additional monitors are activated against the problem-related services in the system. Recursively, the monitored problem-related services act as the client to other services inside the cloud environment and can be used to detect more services which need to be monitored until all the problem-related services are monitored. Due to the complexity of a cloud environment, the monitoring is focused on simulating the access to the application to detect whether it is serving the cloud environment or not. After the problem is fixed, the monitoring can be disabled automatically or manually.

It should be recognized that the problems identified, the path within the topology to identify the problems and how the problem was fixed is used to update or enrich the monitoring suites and analysis module, providing self-learning. Based on the self-learning, the path chosen by analysis module can be altered or weighted based on prior success in identifying problems.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
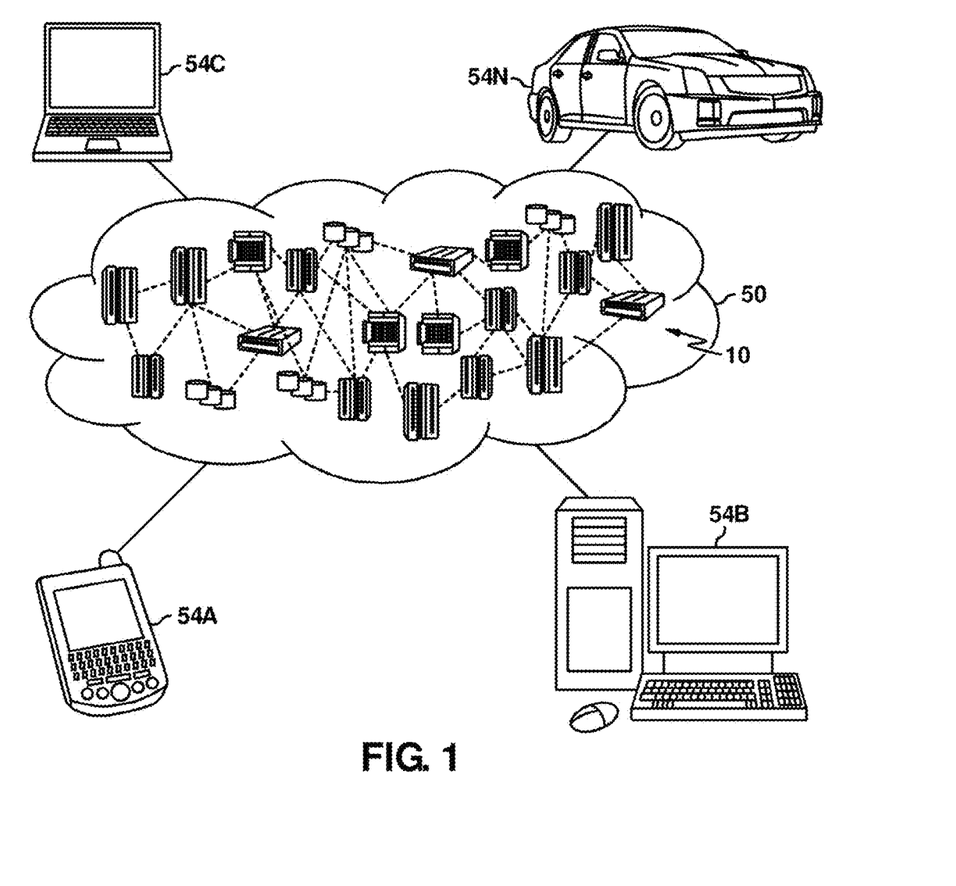
FIG. 1 depicts a cloud computing node according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer MB, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
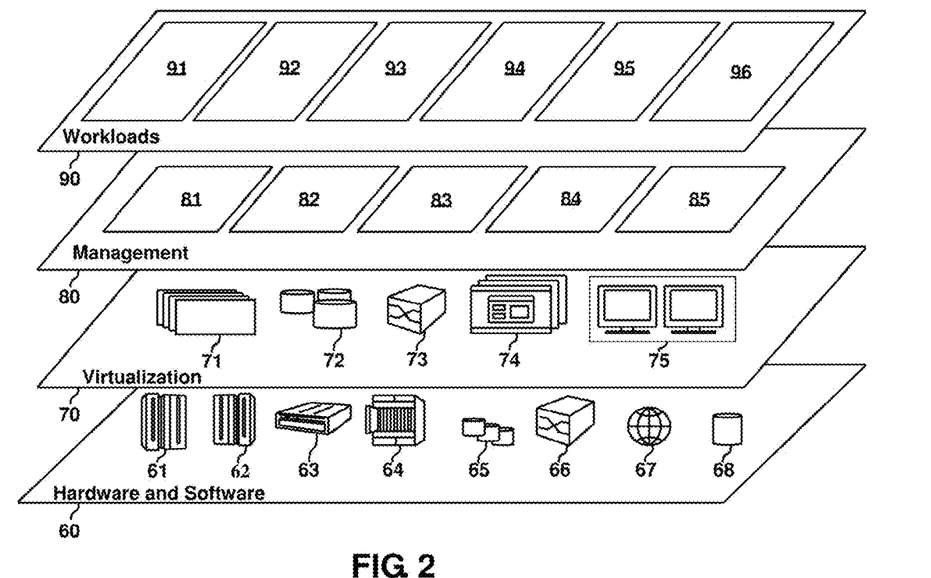
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and monitoring mechanism 96. It should be noted that while the monitoring mechanism 96 is shown in the workload layer 90, in an alternate embodiment, the morning mechanism can be present in the management layer 80, as the monitoring mechanism would cover workload monitoring, as well as infrastructure monitoring.

Figure 3:
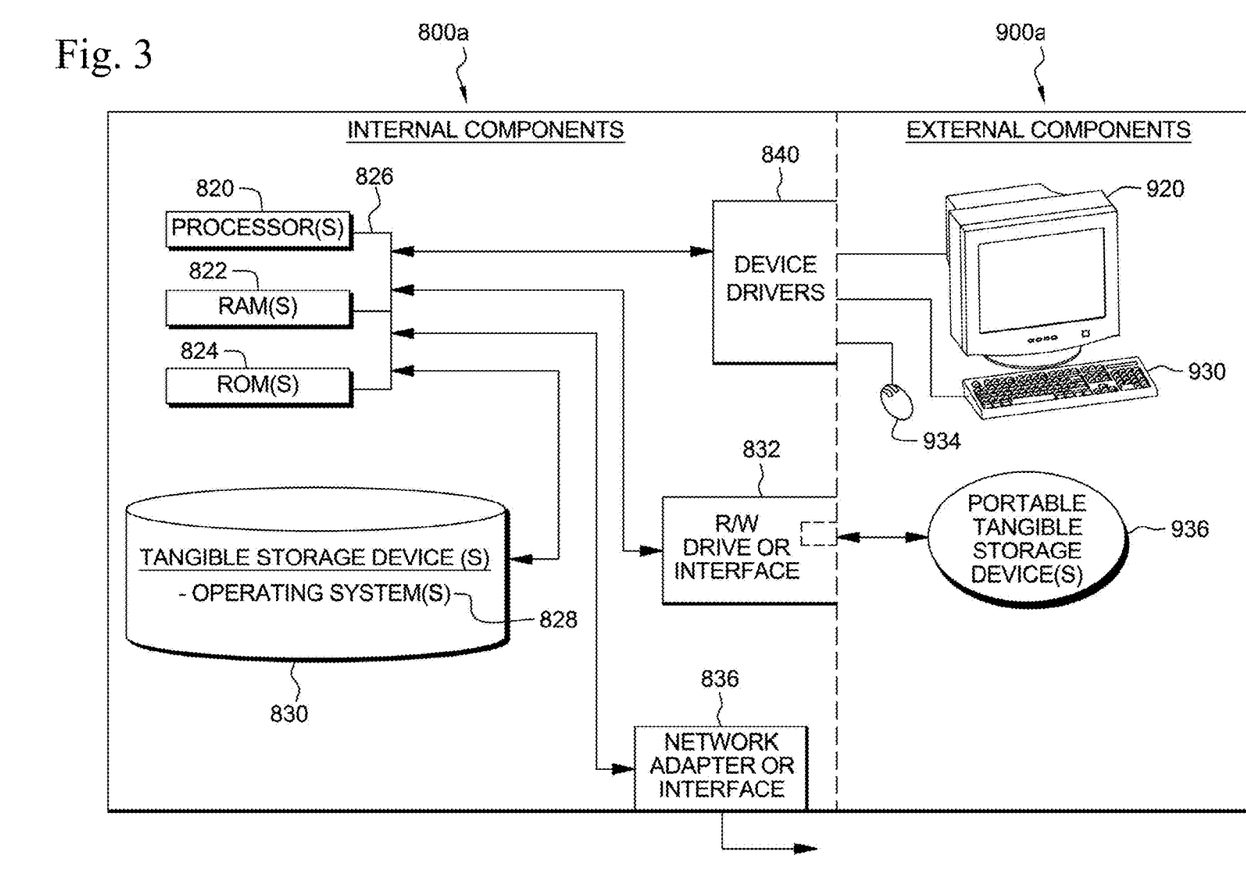
FIG. 3 shows an exemplary diagram of a possible data processing environment in which illustrative embodiments may be implemented.
Figure 5:
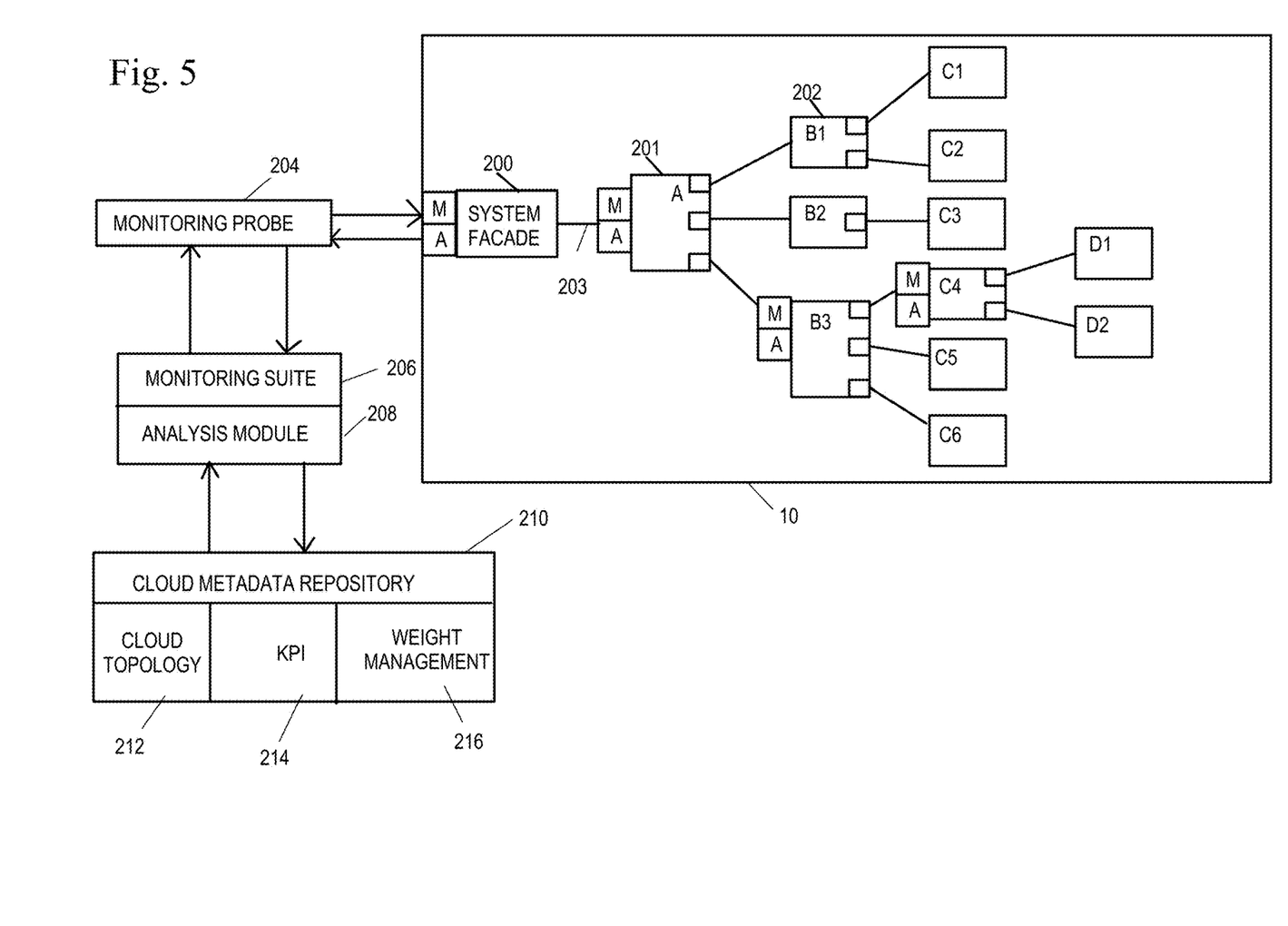
FIG. 5 shows a diagram of a cloud infrastructure and a monitoring mechanism.

FIG. 3 illustrates internal and external components of components of the cloud computing environment 50. In FIG. 5, the cloud computing nodes 10, cloud computing devices, applications of the system, and monitoring mechanism 200 can include respective sets of internal components 800a and external components 900a. Each of the sets of internal components 800a includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 are stored on one or more of the computer-readable tangible storage devices 830 for execution by one or more of the processors 820 via one or more of the RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a also includes a R/W drive or interface 832 to read from and write to one or more portable computer-readable tangible storage devices 936 such as a CD-ROM, DVD, memory stick, magnetic tape, magnetic disk, optical disk or semiconductor storage device.

Each set of internal components 800a also includes a network adapter or interface 836 such as a TCP/IP adapter card. The network may comprise copper wires, optical fibers, wireless transmission, routers, firewalls, switches, gateway computers and/or edge servers.

Each of the sets of external components 900a includes a computer display monitor 920, a keyboard 930, and a computer mouse 934. Each of the sets of internal components 800a also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Figure 4:
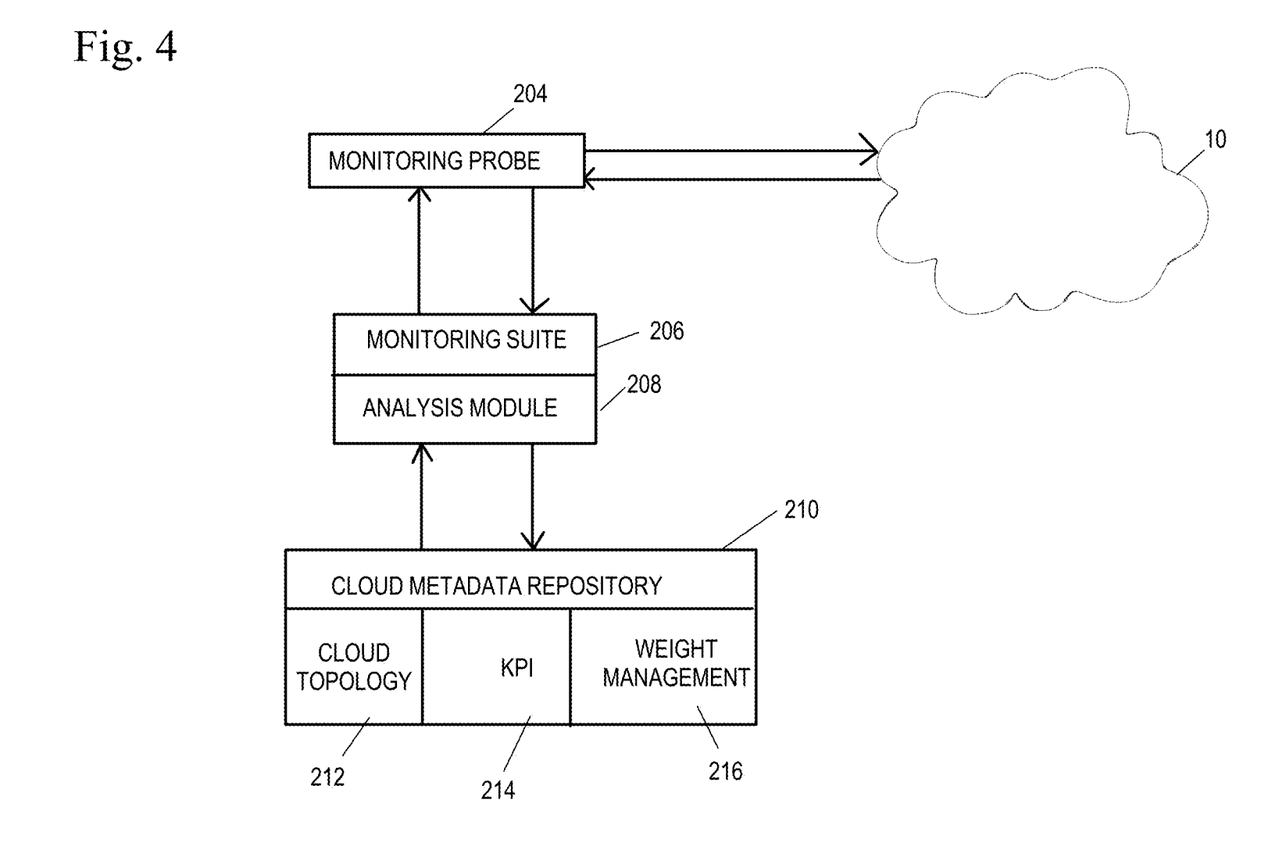
FIG. 4 shows an on demand cloud monitoring mechanism to quickly identify the root cause of cloud operation problems.

FIG. 4 shows an on demand cloud monitoring mechanism to quickly identify root cause of cloud operation problems within the cloud environment.

A cloud monitoring mechanism 200 includes a monitoring probe 204, monitoring suites 206, analysis module 208 and cloud metadata repository 210.

A monitoring probe 204 communicates with the managed cloud computing nodes 10 of the cloud environment 50. The monitoring probe 204 uses cloud topology and KPI information to detect a malfunction point. The monitoring probe 204 monitors the managed cloud 10 and associated nodes on a client side.

A cloud metadata repository 210 stores cloud topology and configuration management database (CMDB) information 212, KPI information 214 for diagnosing cloud computing service nodes 10, and weight management information 216 for each node of the cloud computing service nodes 10. The cloud topology includes the arrangement of cloud network, including its nodes, sub-nodes, connecting lines and pathways.

Based on the stored cloud topology present in a cloud metadata repository 210, a monitoring suite 206 and analysis module 208 are generated for each node type in the cloud topology of the managed cloud. For example, monitoring suites 206 and analysis modules 208 are available for a web server and a database server, or other types of nodes.

During initialization of the cloud metadata repository 210, all cloud resources, i.e. network, computing nodes, controller, nodes, etc. are discovered and stored in the repository 210. When the cloud topology, which is also stored in the cloud metadata repository 210 is defined, all cloud node types and associated workloads are detected and stored in the repository 210. Changes to the cloud topology over the life of the cloud environment are recorded and stored in the repository 210.

Each cloud node type has specific KPIs which evaluate performance and the KPIs may differ across node types. Examples of KPIs are: network latency, CPU utility, memory utility, disk input/output and application latency.

The weight management information 216 is calculated based on KPI information, traffic intensity and historical failure times. A weight may be assigned to each node in each pathway. The weight of the nodes from level to level determines the next node in the pathway along the cloud topology.

A predefined policy for evaluation of malfunction points may also be stored in the cloud metadata repository 210. The predefined policy may be updated by an administrator. The cloud metadata repository 210 may additional include optimized diagnostic paths which are calculated based on weight management information and a diagnostic sequence.

For example, when a detected node has sub-nodes, the detecting action of the monitoring probe 204 does not verify the status of every sub-node. Instead, the monitoring probe 204 checks the weight management information 216 in the cloud metadata repository 210 to determine which sub-node is the target node in which the status needs to be detected. The next node which will be detected is based on the predefined policy in the cloud metadata repository and triggers a next action regarding a next rooting node. Once all of the actions have been executed and no next rooting node exists per the predefined policy, root cause confirmation via the analysis module and monitoring suites occurs.

Referring to FIG. 5, A is a target node 201 with B2, B2, and B3 being sub-nodes 202 of target node A. An example of pathway 203 is system façade 200 to Node A to sub-node B3 to sub-node C4 and sub-node D2. Sub-nodes B1, B2, C1-C3, C5, C6 and D1 are not part of pathway 203 shown in FIG. 5. While pathway 203 is used an example, this is not the only pathway that is possible from the nodes shown in the cloud managed node 10.

The monitoring probe 204 monitors a cloud managed node 10. The cloud managed node 10 has a plurality of nodes 201, 202 which are connected via pathways 203.

When a malfunction point or exception is detected, for example through a response time below a threshold, the monitoring probe 204 installs corresponding monitoring suites 206 and analysis module 208 on an entry node or system façade 200.

If the current node in which the monitoring suite 206 (M) and analysis module 208 (A) are installed is the root cause of the exception or malfunction, the installed monitoring suite 206 (M) and analysis module 208 (A) are uninstalled.

If the current node in which the monitoring suite 206 (M) and analysis module 208 (A) is not the root cause, the monitoring probe 204 installs corresponding monitoring suite 206 (M) and analysis module 208 (A) on a next node which has highest weight to the current node until the root cause is found or the pathway through the nodes has ended. The weight of the node is preferably found in the cloud metadata repository 210. The weight of the nodes is based on prior success in identifying problems within a specific node and the history of failures associated with a node. The monitoring suites 206 (M) and analysis module 208 (A) are installed on all signal nodes until the root cause is identified.

If the root cause is not found, and all of the nodes are traversed by the monitoring probe 204, the problem is diagnosed manually.

For example, referring to pathway 203, the analysis module 208 (A), through the cloud metadata repository 210 has accesses to the failures that have occurred for each of the nodes of the topology. In the past, there have been four failures from sub-node B3 to sub-node C4, three failures from sub-node B3 to sub-node C5. Based on this past history, the weight of pathway between sub-node B3 to sub-node C4 would be greater than the weight of the pathway between sub-node B3 to sub-node C5. The analysis module 208 (A) would recommend a pathway that has the higher weight. It should be noted that besides failures of the sub-nodes, other factors such as other relationships between sub-nodes and nodes, affinity and traffic intensity may also alter the weight of a pathway between sub-nodes.

Monitoring suites 206 are specific to each kind or type of node. The monitoring suites 206 include a plurality of monitoring tools or agents which monitor the operating system, hardware, hypervisor, applications, network, and log files. The monitoring suites 206 are produced from operation (monitoring and analysis toolkits and from self-learning) and are enriched from historic operation of said nodes.

If the root cause is not discovered using the monitoring probe 204, the root cause can be manually provided to the cloud metadata repository 210 with the corresponding solution and access by the monitoring suites 206.

The analysis module 208 uses a collection of KPIs to determine the root cause and node weight of a node. Each type of node within the managed cloud node 10 has a different collection of KPIs. The KPIs for each type of node is preferably stored in the cloud metadata repository 210.

The analysis module 208 updates the weight value of each node dynamically based on many factors such as network latency, CPU Utility, Mem Utility, Disk input/output, application latency and other factors. When the analysis module 208 is installed on a specific node, the analysis module 208 analyzes data collected from the monitoring suite 206 also installed on the same node. The analysis module 208 determines whether the current node is the node which is the root cause of the problem.

For example, if sub-nodes C4 is a database node, the monitoring suite 206 (M) for this type of database node collects a database log, database tablespace, bugger pool, configuration information, etc. The associated analysis module 208 (A) for this database node applies a set of root cause analysis rules & patterns and parses the logs, configuration, and all monitoring output, to detect data that provides an indication of the root cause relative to the root cause analysis rules & patterns. In this example, if the associated analysis module 208 (A) discovers a disk full message in log, then the analysis module 208 determines the disk full of the sub-node to be the root cause.

In terms of self-learning patterns, if the disk full message has not been associated with sub-node C4, then the detection of such an error and the associated analysis logic would be stored in the cloud metadata repository as a KPI and/or the monitoring suites 206 & analysis module 208. The self-learning and the associated patterns are used to continuously learn the root causes of the system.

If the current node is the node with the service problem, the monitoring probe 204 recycles the analysis module 208 and the monitoring suite 206 and the monitoring probe 204 reports the root cause of the problem a cloud management platform, which can be monitored by an administrator.

If the analysis module 208 determines that the current node is not the root cause, the analysis module 208 informs the monitoring probe 204 to check another node specified by the analysis module 208.

If the root cause of the problem is not discovered through the monitoring probe 204, the root cause can be manually provided to the cloud metadata repository 210 with the corresponding solution.

Figure 6:
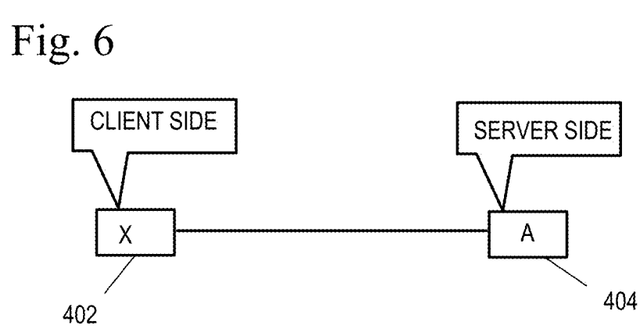
FIG. 6 shows a schematic of client side and server side services.

For example, and referring to FIG. 6, in the normal status, the service X on the client side 402 is monitored by the monitoring probe 204, and the monitor suite on the service A on the server side 404 itself is inactivated. The term "inactivated" is defined as the monitor is not installed, the monitor is stopped, or the monitor is not monitoring the target service.

A response time of service A 404 is obtained by monitoring probe 204 through service X. If the response time is below a threshold, monitoring on service A is initiated by the monitor probe 204 and a monitoring agent comprising a monitoring suite 206 and analysis module 208 are installed on the node. If the monitoring suite 204 and analysis module 208 are present on the node and have stopped, the monitoring suite 206 is reactivated and configured to monitor the target service.

The monitor probe 204 uses a service end point (IP+port #) to query the server application information for service A from the server OS interface (IP+Port=>Process=>Application info) to determine what kind of monitoring toolkits to install or activate on the node, the monitoring toolkits to monitor application.

After the problem is fixed, another trigger will be used to make the monitor on the service A inactive to configure the monitor to not monitor the target service, stop the monitor if needed, and uninstall the monitor if needed. The analysis module 208 keeps checking the KPI data of the node, and once it is determined that the KPI is within a range which is acceptable, a message is sent to the monitoring probe 204 and the monitoring probe 204 either recycle the monitoring suites 206 and analysis module 208 are inactivated or uninstalled.

Referring back to FIG. 5, in a more complex and recursive system, in a first step, a response time of service A is received via the monitoring probe 204 on the system façade 200. If the response time is below a threshold, monitoring of service A is activated by installing a monitoring suite 206 and an analysis module 208. A response time is received for services B1, B2, B3 via the monitoring suite 206 and the analysis module 208 on the service A. If the response time is below a threshold, the monitor on service B3 is activated, by installing a monitoring suite 206 and analysis module 208. A response time is then received for services C4, C5, C6 via the monitoring suite 206 and an analysis module 208 on the service B3. If the response time is below a threshold for service C4, the monitor on service C4 is activated, by installing a monitoring suite 206 and an analysis module 208. A response time of services D1, D2 is received via the monitoring suite 206 and the analysis module 208 on the service C4. The response times of service of D1 and D2 are above the threshold. Based on the response times of the services of D1 and D2 from service C4, the analysis module 208 determines that the root cause of the response times below a threshold on the client side is service C4. The pathway is therefore, service A, service B3 and then service C4. The end of the pathway is service C4 and not service D1 and D2, since the latency or response time if services D1 and D2 is above a threshold. It should be noted that other pathways through the nodes and sub-nodes are possible.

After determining that the root cause is service C4, the monitoring suite 206 and the analysis module 208 logic and associated data used to determine the root cause is used to generate additional KPIs and to provide additional data for determining weights of nodes in the weight management 216 of the cloud metadata repository 210. It should be noted that the monitoring suite 206 and the analysis module 208 are uninstalled after the root cause is determined as discussed above.

Figure 7:
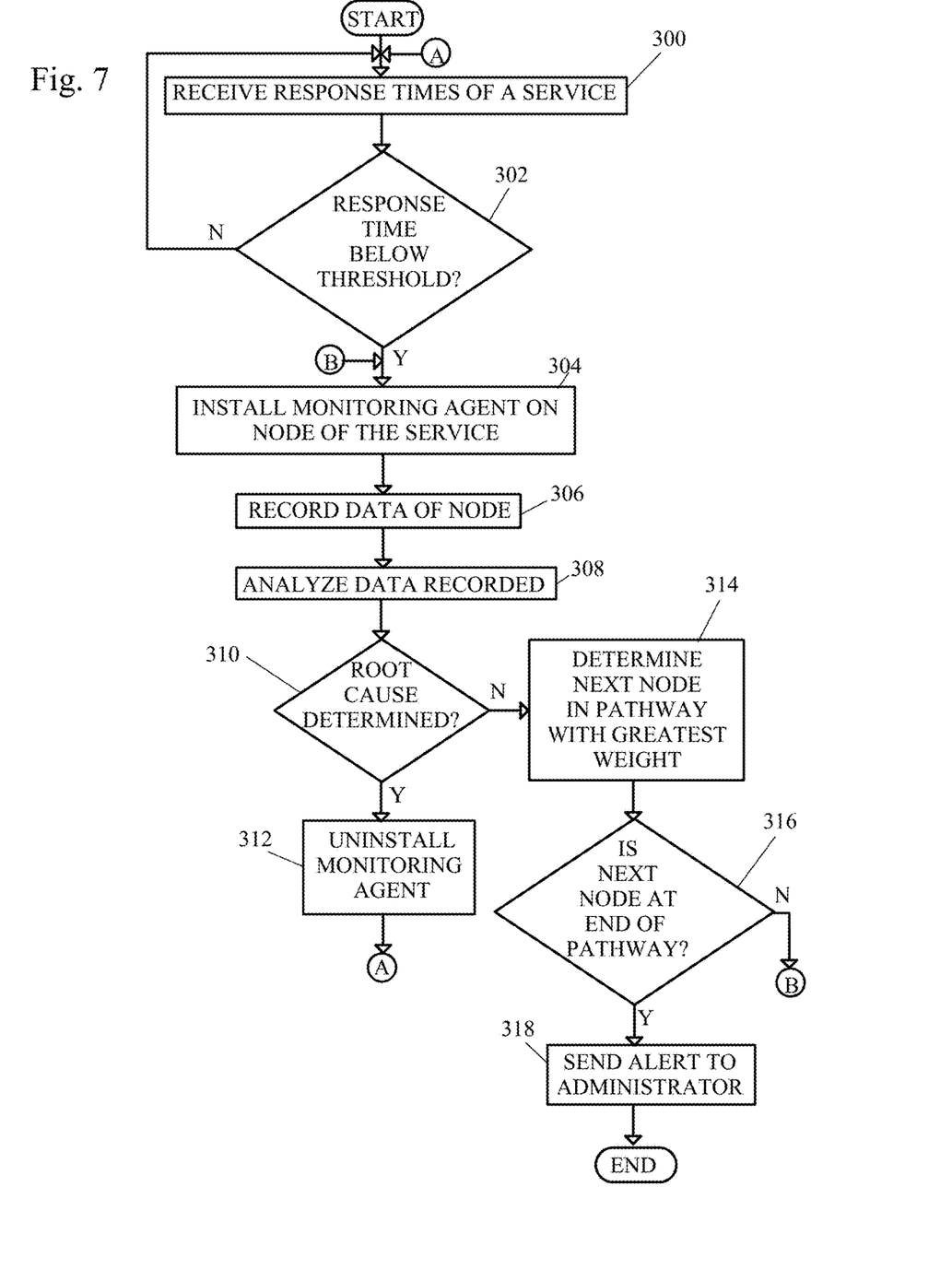
FIG. 7 shows a flow diagram of a method of determining root causes of cloud operation problems.

FIG. 7 shows a flow diagram of a method of determining root causes of cloud operation problems.

In a first step, response times of at least one service are received (step 300). The response times are preferably monitored by the monitoring probe 204.

If the response time is below a threshold (step 302), a monitoring agent of the monitoring probe comprising a monitoring suite 206 and an analysis module 208 are installed on the node of the service (step 304). The monitoring agent records data regarding the node (step 306), for example by the monitoring suite 206. The monitoring agent then analyzes the data regarding the node (step 308), for example using the analysis module 208 of the monitoring agent.

If the root cause is determined (step 310), for example by the analysis module, the monitoring agent comprising the monitoring suite 206 and analysis module 208 is then uninstalled from the node (step 312) and the method returns to step 300 of receiving response times from a service. The root cause may be sent to a cloud management platform, for example in management layer 80.

If the root cause is not determined (step 310), the monitoring agent determines the next node in a pathway with the greatest weight (step 314). If the next node is at the end of the pathway (step 316), an alert is sent to an administrator regarding the malfunction (step 318) and the method ends.

If the next node is not at the end of the pathway (step 316), the method repeats at step 304 with installing a monitoring agent on a node of the service and continues thereon.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of determining root causes of operation problems of a service having a client side and a server side, the service being provided by an environment comprising a plurality of nodes and sub-nodes connected through pathways, the service being monitored by a monitoring probe with a monitoring agent comprising a monitoring suite and an analysis module, the method comprising the steps of:
   a) the monitoring probe receiving a response time of a service of the environment below a threshold on the client side of the service;
   b) in response to the monitoring probe receiving the response time of the service below the threshold on the client side of the server, the monitoring probe installing the monitoring suite and analysis module on a first node of the service on the server side of the service;
   c) the monitoring probe recording and analyzing data of the first node of the service to determine whether the response time of the service being below the threshold on the client side of the service is caused by the first node;
   d) the monitoring probe receiving an analysis as to whether the first node of the service is the cause of the response time of the service being below the threshold on the client side of the service;
   when the response time of the service being below the threshold on the client side of the service is not caused by the first node the monitoring probe:
   e) determining a next node in the pathway of the first node on the server side to install the monitoring suite and analysis module on to determine whether the response time of the service being below the threshold on the client side is caused by the next node on the server side; and
   repeating step e) until the cause of the response time of the service being below the threshold on the client side is determined or the pathway of nodes within the environment for the service has ended.

2. The method of claim 1, wherein when the cause of the response time of the service being below the threshold on the client side is determined, the monitoring probe removing the monitoring suite and analysis module from the node of the service on the server side.

3. The method of claim 1, wherein the next node is determined based on a weight assigned by the analysis module.

4. The method of claim 1, wherein if the pathway has ended and the cause of the response time of the service being below the threshold has not been determined, sending an alert to an administrator.

5. The method of claim 3, wherein the weight is selected from the group consisting of: key performance indicators, historical failure times of the service, and traffic intensity within the environment.

6. The method of claim 5, wherein the key performance indicators are selected from the group consisting of: network latency, computer processing utility, memory utility, disk input, disk output and service application latency.

7. A computer program product for determining root causes of operation problems of a service having a client side and a server side, the service being provided by an environment comprising a plurality of nodes and sub-nodes connected through pathways, the service being monitored by a monitoring probe with a monitoring agent comprising a monitoring suite and an analysis module, the monitoring probe comprising a computer comprising at least one processor, one or more memories, one or more computer readable storage media, the computer program product comprising a computer readable storage medium having program instructions embodied therewith, the program instructions executable by the computer to perform a method comprising:
   a) receiving, by the monitoring probe, a response time of a service of the environment below a threshold on the client side of the service;
   b) installing, by the monitoring probe, in response to the response time received of the service below the threshold on the client side of the service, the monitoring suite and analysis module on a first node of the service on the server side of the service;
   c) recording and analyzing, by the monitoring probe, data of the first node of the service to determine whether the response time of the service being below the threshold on the client side of the service is caused by the first node;
   d) receiving, by the monitoring probe, an analysis as to whether the first node of the service is the cause of the response time of the service being below the threshold on the client side of the service;
   when the response time of the service being below the threshold on the client side of the service is not caused by the first node:
   e) determining, by the monitoring probe, a next node in the pathway of the first node on the server side to install the monitoring suite and analysis module on to determine whether the response time of the service being below the threshold on the client side is caused by the next node on the server side; and
   repeating program instructions e) until the cause of the response time of the service being below the threshold on the client side is determined or the pathway of nodes within the environment for the service has ended.

8. The computer program product of claim 7, wherein when the cause of the response time of the service being below the threshold on the client side is determined, removing, by the monitoring probe, the monitoring suite and analysis module from the node of the service on the server side.

9. The computer program product of claim 7, wherein the next node is determined based on a weight assigned by the analysis module.

10. The computer program product of claim 7, wherein if the pathway has ended and the cause of the response time of the service being below the threshold has not been determined, sending, by the monitoring prone, an alert to an administrator.

11. The computer program product of claim 9, wherein the weight is selected from the group consisting of: key performance indicators, historical failure times of the service, and traffic intensity within the environment.

12. The computer program product of claim 11, wherein the key performance indicators are selected from the group consisting of: network latency, computer processing utility, memory utility, disk input, disk output and service application latency.

13. A computer system for determining root causes of operation problems of a service having a client side and a server side, the service being provided by an environment comprising a plurality of nodes and sub-nodes connected through pathways, the service being monitored by a monitoring probe with a monitoring agent comprising a monitoring suite and an analysis module, the monitoring probe comprising a computer comprising at least one processor, one or more memories, one or more computer readable storage media having program instructions executable by the computer to perform the program instructions comprising:
 a) receiving, by the monitoring probe, a response time of a service of the environment below a threshold on the client side of the service;
 b) installing, by the monitoring probe, in response to the response time received of the service below the threshold on the client side of the service, the monitoring suite and analysis module on a first node of the service on the server side of the service;
 c) recording and analyzing, by the monitoring probe, data of the first node of the service to determine whether the response time of the service being below the threshold on the client side of the service is caused by the first node;
 d) receiving, by the monitoring probe, an analysis as to whether the first node of the service is the cause of the response time of the service being below the threshold on the client side of the service;
 when the response time of the service being below the threshold on the client side of the service is not caused by the first node:
 e) determining, by the monitoring probe, a next node in the pathway of the first node on the server side to install the monitoring suite and analysis module on to determine whether the response time of the service being below the threshold on the client side is caused by the next node on the server side; and
 repeating program instructions e) until the cause of the response time of the service being below the threshold on the client side is determined or the pathway of nodes within the environment for the service has ended.

14. The computer system of claim 13, wherein when the cause of the response time of the service being below the threshold on the client side is determined, removing, by the monitoring probe, the monitoring suite and analysis module from the node of the service on the server side.

15. The computer system of claim 13, wherein the next node is determined based on a weight assigned by the analysis module.

16. The computer system of claim 13, wherein if the pathway has ended and the cause of the response time of the service being below the threshold has not been determined, sending, by the monitoring prone, an alert to an administrator.

17. The computer system of claim 15, wherein the weight is selected from the group consisting of: key performance indicators, historical failure times of the service, and traffic intensity within the environment.

18. The computer system of claim 17, wherein the key performance indicators are selected from the group consisting of: network latency, computer processing utility, memory utility, disk input, disk output and service application latency.

* * * * *